United States Patent
Kim et al.

(10) Patent No.: US 8,571,210 B2
(45) Date of Patent: Oct. 29, 2013

(54) CONTENT PROTECTION APPARATUS AND METHOD USING BINDING OF ADDITIONAL INFORMATION TO ENCRYPTION KEY

(75) Inventors: Sin-Hyo Kim, Daejeon (KR);
Yun-Kyung Lee, Daejeon (KR);
Byung-Ho Chung, Daejeon (KR);
Hye-Ran Mun, Gwangju (KR);
Sang-Woo Lee, Daejeon (KR);
Sok-Joon Lee, Daejeon (KR);
Jung-Yeon Hwang, Suwon (KR);
Gun-Tae Bae, Daejeon (KR);
Hyun-Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 71 days.

(21) Appl. No.: 13/241,124

(22) Filed: Sep. 22, 2011

(65) Prior Publication Data
US 2012/0099726 A1 Apr. 26, 2012

(30) Foreign Application Priority Data
Oct. 25, 2010 (KR) .................. 10-2010-0104173

(51) Int. Cl.
*H04L 9/00* (2006.01)
(52) U.S. Cl.
USPC .................. 380/44; 380/28; 380/29; 380/30; 380/37; 380/45; 380/46; 380/255; 380/259; 380/264; 380/277; 380/283; 380/286; 713/150; 713/168; 713/176; 713/189; 713/190; 713/191; 713/192; 713/193; 713/194; 708/144; 708/250; 717/140; 726/26

(58) Field of Classification Search
USPC ........................................... 380/44
See application file for complete search history.

(56) References Cited

U.S. PATENT DOCUMENTS

2007/0086586 A1\* 4/2007 Jakubowski et al. ........... 380/28
2008/0292103 A1 11/2008 Lee et al.
2009/0313480 A1\* 12/2009 Michiels et al. .............. 713/187

FOREIGN PATENT DOCUMENTS

WO WO 2009/034504 A2 3/2009

\* cited by examiner

*Primary Examiner* — Nathan Flynn
*Assistant Examiner* — Bryan Wright

(57) ABSTRACT

The present invention relates to a content protection apparatus and method using binding of additional information to an encryption key. The content protection apparatus includes an encryption unit for creating an encryption key required to encrypt data requested by a user terminal and then generating encrypted data in which the data is encrypted. An additional information management unit manages additional information including authority information about the encrypted data. A White-Box Cryptography (WBC) processing unit generates a WBC table required to bind the encryption key corresponding to the encrypted data to the additional information. A bound data generation unit generates bound data in which the encrypted key is bound to the additional information, using a cipher included in the WBC table.

16 Claims, 6 Drawing Sheets

CONTENT PROTECTION APPARATUS AND METHOD USING BINDING OF ADDITIONAL INFORMATION TO ENCRYPTION KEY

CROSS REFERENCE TO RELATED APPLICATION

This application claims the benefit of Korean Patent Application No. 10-2010-0104173, filed on Oct. 25, 2010, which is hereby incorporated by reference in its entirety into this application.

BACKGROUND OF THE INVENTION

1. Technical Field

The present invention relates generally to a content protection apparatus and method using the binding of additional information to an encryption key and, more particularly, to a content protection apparatus and method, which bind additional information required to check integrity (to determine whether forgery has occurred) to an encryption key used to encrypt content and provide a user with bound result data, thus enabling the application of a technique for performing decryption while checking the integrity of the encryption key and the additional information.

2. Description of the Related Art

Digital Rights Management (DRM) technology used to distribute and protect digital content is implemented to encrypt content and transmit both a content encryption key and content authority information to each user terminal using a method whereby only the proper recipient is allowed to decipher the content encryption key and the content authority information in order to protect the rights of content providers.

An existing encryption mechanism is configured to externally receive an encryption key and encrypt plain text into cipher text or configured to receive cipher text and an encryption key as input and perform decryption. However, most software can detect an encryption calculation procedure and all intermediate values via a software analysis attack such as that of a debugger, and can decipher and infer the encryption key.

White-box cryptography is a new encryption technique which represents such an encryption mechanism by a large look-up table and conceals encryption keys in the look-up table, thus making it impossible to infer which key is an actual encryption key even if an attacker monitors encryption key processing. This technique was disclosed in the thesis entitled "White-Box Cryptography and an AES Implementation" by S. Chow, P. Eisen, H. Johnson, P. C. van Oorschot in Proc. of the 9th Annual Workshop on Selected Areas in Cryptography in 2002.

Meanwhile, in the case of existing DRM systems, when the copyright of content is protected, the content is encrypted, and an encryption key used therein is separately transferred with the encryption key included in authority information. As a result, a problem may arise in that the authority information included in the software of a hackable terminal or stored in a specific area of the terminal may be divulged and illegally reused on other platforms.

SUMMARY OF THE INVENTION

An object of the present invention is to provide a content protection apparatus and method using the binding of additional information to an encryption key, which bind an encryption key to additional information such as data authority information, so that when the additional information changes, the encryption key also changes together with the additional information, thus making it impossible to intentionally decrypt data, and so that the encryption key is concealed using white-box cryptography, thus making it impossible to decipher the encryption key.

Another object of the present invention is to provide a content protection apparatus and method using the binding of additional information to an encryption key, in which when a user terminal is aware of a security risk situation involving encrypted data, an encryption key or the like, the user terminal reports this situation to a server, so that the encryption key and the encrypted data are redistributed, thus preventing data from being illegally duplicated and used on other platforms.

In accordance with an aspect of the present invention to accomplish the above objects, there is provided a content protection apparatus using binding of additional information to an encryption key, including an encryption unit for creating an encryption key required to encrypt data requested by a user terminal and then generating encrypted data in which the data is encrypted, an additional information management unit for managing additional information including authority information about the encrypted data, a White-Box Cryptography (WBC) processing unit for generating a WBC table required to bind the encryption key corresponding to the encrypted data to the additional information, and a bound data generation unit for generating bound data in which the encrypted key is bound to the additional information, using a cipher included in the WBC table.

Preferably, the bound data may be set such that when the additional information changes, the encryption key bound to the additional information also automatically changes.

Preferably, the WBC processing unit may transmit the WBC table to the user terminal before transmitting both the encrypted data and the bound data to the user terminal.

Preferably, the content protection apparatus may further include a risk management unit for, when a request for management of a risk is received from the user terminal, determining and processing a security risk situation involving the encrypted data and the bound data which have been transmitted to the user terminal.

Preferably, the encryption unit may recreate a new encryption key required to encrypt the data at a request of the risk management unit if the security risk situation has been determined to occur, thus generating encrypted data in which the data is re-encrypted.

Preferably, the bound data generation unit may regenerate bound data in which the new encryption key is bound to additional information related to the encrypted data at a request of the risk management unit if the new encryption key has been recreated.

Preferably, the data management unit may upgrade software version of the data at a request of the risk management unit if the security risk situation has been determined to occur.

In accordance with another aspect of the present invention to accomplish the above objects, there is provided a content protection apparatus using binding of additional information to an encryption key, including a White-Box Cryptography (WBC) table mapping unit for, when encrypted data and bound data are received from a server, extracting a white-box cipher required to unbind the bound data from a pre-stored WBC table, an unbinding unit for unbinding an encryption key and additional information of the bound data using the white-box cipher, a decryption unit for decrypting the encrypted data using the unbound encryption key if the bound data has been unbound, and a data processing unit for playing the decrypted data at a request of a user.

Preferably, the content protection apparatus may further include a security risk situation determination unit for, if decryption of the encrypted data has failed, determining that as the additional information has changed due to an external attack, the encryption key has also changed, and then requesting the server to manage a risk.

In accordance with a further aspect of the present invention to accomplish the above objects, there is provided a content protection method using binding of additional information to an encryption key, the method being performed by a server, including creating an encryption key required to encrypt data requested by a user terminal and then generating encrypted data in which the data is encrypted, generating a White-Box Cryptography (WBC) table required to bind the encryption key, which corresponds to the encrypted data, to additional information, which includes authority information about the encrypted data, generating bound data in which the encryption key is bound to the additional information by using a cipher included in the WBC table, and transmitting both the encrypted data and the bound data to the user terminal.

Preferably, the bound data may be set such that when the additional information changes, the encryption key bound to the additional information also automatically changes.

Preferably, the content protection method may further include, before the transmitting, transmitting the WBC table to the user terminal.

Preferably, the content protection method may further include, if a request for management of a risk involving the encrypted data or the bound data is received from the user terminal, determining and processing a security risk situation involving the encrypted data or the bound data.

Preferably, the content protection method may further include, if the security risk situation has been determined to occur, recreating a new encryption key required to encrypt the data, and then generating encrypted data in which the data is re-encrypted.

Preferably, the content protection method may further include, if the new encryption key has been recreated, regenerating bound data in which the new encryption key is bound to additional information related to the encrypted data.

Preferably, the content protection method may further include, if the security risk situation has been determined to occur, upgrading software version of the data.

In accordance with yet another aspect of the present invention to accomplish the above objects, there is provided a content protection method using binding of additional information to an encryption key, the method being performed by a user terminal, including when encrypted data and bound data are received from a server, unbinding an encryption key and additional information of the bound data using a white-box cipher included in a pre-stored White-Box Cryptography (WBC) table, when the bound data is unbound, decrypting the encrypted data using the unbound encryption key, and playing the decrypted data at a request of a user.

Preferably, the content protection method may further include, if decryption of the encrypted data has failed, determining that as the additional information has changed due to an external attack, the encryption key has changed, and then requesting the server to manage a risk.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described with reference to the attached drawings.

Figure 1:
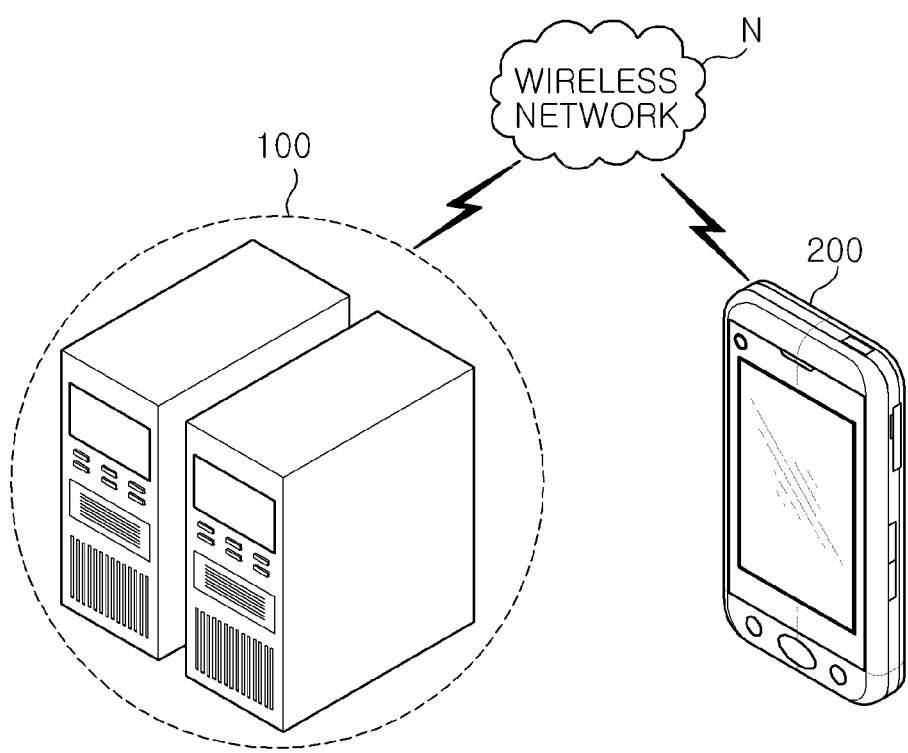
FIG. 1 is a diagram showing the construction of a system to which a content protection apparatus using the binding of additional information to an encryption key according to the present invention is applied.

FIG. 1 is a diagram showing the construction of a system to which a content protection apparatus using the binding of additional information to an encryption key according to the present invention is applied.

As shown in FIG. 1, the system to which the content protection apparatus according to the present invention is applied mainly includes a server 100 and a user terminal 200. The server 100 and the user terminal 200 transmit or receive data therebetween via a wireless network N, and the content protection apparatus is applied to each of the server 100 and the user terminal 200. Therefore, the content protection apparatus described in the claims will be described below with respect to the server 100 to which the content protection apparatus is applied and to the user terminal 200 to which the content protection apparatus is applied.

The server 100 binds an encryption key, which is used to generate encrypted data, to additional information, which includes authority information or the like about the encrypted data. In this case, the server 100 binds the encryption key to the additional information using white-box cryptography (WBC) technology.

Here, the term "WBC" denotes new cryptography (WBC Application Environment Specification (AES), WBC Rivest-Shamir-Adleman (RSA), etc.) implemented such that an encryption key is concealed in an encryption/decryption algorithm using cryptography, thus preventing the encryption key from being deciphered even if the operating process of software which is a white box is analyzed.

In the present invention, the additional information to be bound to the encryption key is used to check the integrity of the relevant encryption key, and is set such that when the additional information is optionally changed while the encryption key is being bound to the additional information, the encryption key is also changed.

In this regard, the server 100 and the user terminal 200 to which the content protection apparatus is applied will be described in detail with reference to the embodiments of FIGS. 2 and 3.

Figure 2:
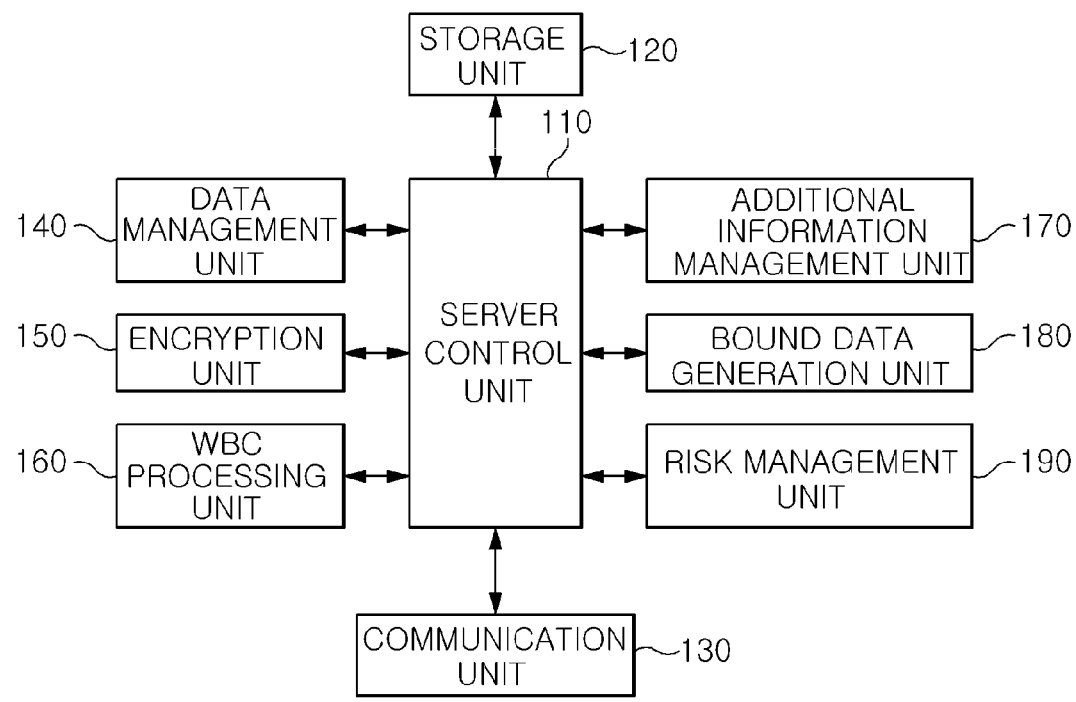
FIG. 2 is a block diagram showing the construction of a server to which the content protection apparatus using the binding of additional information to an encryption key according to the present invention is applied.

FIG. 2 is a block diagram showing the construction of the server to which the content protection apparatus using the binding of additional information to an encryption key according to the present invention is applied.

As shown in FIG. 2, the server 100 according to the present invention includes a server control unit 110, a storage unit 120, a communication unit 130, a data management unit 140, an encryption unit 150, a white-box cryptography (WBC) processing unit 160, an additional information management unit 170, a bound data generation unit 180, and a risk management unit 190. In this case, the server control unit 110 controls the operations of individual units of the server 100.

The storage unit 120 stores data such as content, and also stores an encryption key used to encrypt the data, a white-box cryptography (WBC) table, etc. The communication unit 130 is connected to the user terminal 200 to transmit or receive data to or from the user terminal 200.

The data management unit 140 manages the pieces of data stored in the storage unit 120. When a request for data is received from the user terminal 200 connected via the communication unit 130, the data management unit 140 then extracts requested data and transfers the data to the encryption unit 150.

The encryption unit 150 creates an encryption key required to encrypt the data extracted by the data management unit 140. In this case, the encryption unit 150 encrypts relevant data using the created encryption key.

Meanwhile, the WBC processing unit 160 generates a WBC table required to bind the encryption key, which has been created by the encryption unit 150, to additional information which has been input for the relevant data. In this case, the WBC processing unit 160 transmits the WBC table to the user terminal 200 before transmitting the encrypted data and the encryption key to the user terminal 200.

The additional information management unit 170 manages additional information related to the encrypted data. Here, the additional information includes information about the relevant data, authority information about the encrypted data, etc. Of course, the additional information management unit 170 may revise the authority information or the like at the request of a user.

The bound data generation unit 180 generates bound data in which the encryption key corresponding to the relevant data is bound to the additional information by using a cipher included in the WBC table if the data encryption has been completed by the encryption unit 150.

Here, the bound data is obtained by binding the encryption key to the additional information using WBC, so that when the additional information changes, the encryption key bound to the additional information also automatically changes. Therefore, the user can verify the integrity of the corresponding encryption key using the additional information included in the bound data.

After transmitting both the encrypted data and the bound data to the user terminal 200, the risk management unit 190 processes and manages the risk of the user terminal 200 when receiving information about a security risk situation from the user terminal 200.

That is, when a security risk situation occurs in relation to the encrypted data or the encryption key, the risk management unit 190 requests the encryption unit 150 to recreate an encryption key and requests the bound data generation unit 180 to regenerate bound data related to the recreated encryption key.

In this case, the risk management unit 190 processes the risk by retransmitting the regenerated encrypted data and the regenerated bound data to the user terminal 200.

Figure 3:
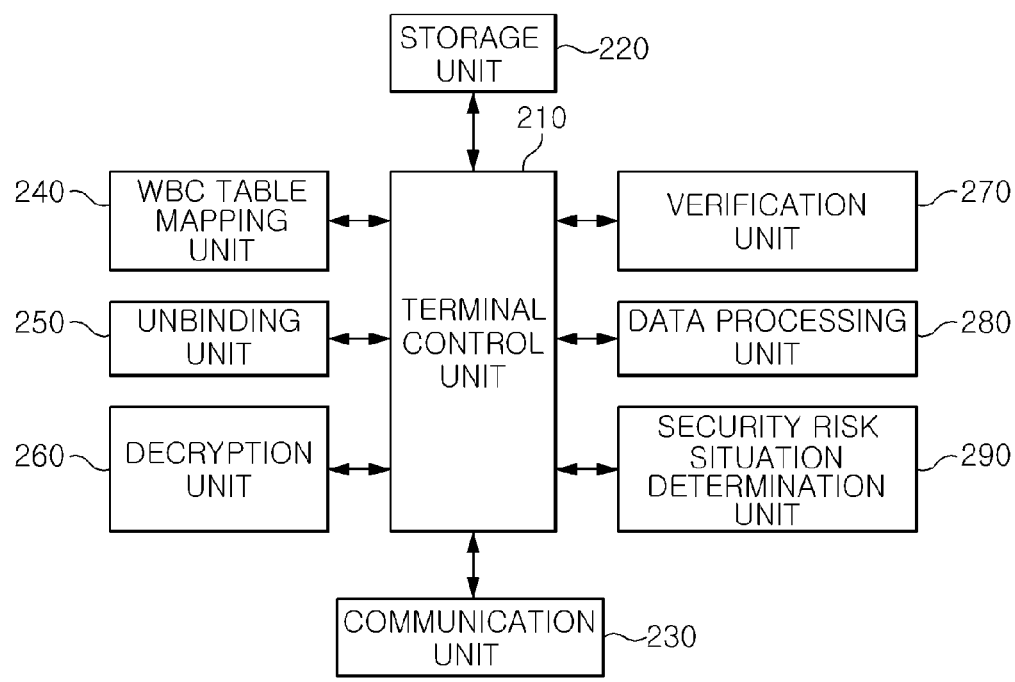
FIG. 3 is a block diagram showing the construction of a user terminal to which the content protection apparatus using the binding of additional information to an encryption key according to the present invention is applied.

FIG. 3 is a block diagram showing the construction of a user terminal to which the content protection apparatus using the binding of additional information to an encryption key according to the present invention is applied.

As shown in FIG. 3, the user terminal 200 of the present invention includes a terminal control unit 210, a storage unit 220, a communication unit 230, a WBC table mapping unit 240, an unbinding unit 250, a decryption unit 260, a verification unit 270, a data processing unit 280, and a security risk situation determination unit 290. In this case, the terminal control unit 210 controls the operations of the individual units of the user terminal 200.

The storage unit 220 stores encrypted data and bound data received from the server 100, and also stores a WBC table. Further, the storage unit 220 stores the encryption key and the additional information of the bound data which has been unbound using the WBC table. The communication unit 230 is connected to the user terminal 200 to transmit or receive data to or from the user terminal 200.

When bound data is received from the server 100 connected via the communication unit 230, the WBC table mapping unit 240 extracts a white-box cipher required to unbind the bound data from the WBC table stored in the storage unit 220.

The unbinding unit 250 unbinds the encryption key and the additional information of the bound data using the white-box cipher extracted from the WBC table.

If the bound data is unbound by the unbinding unit 250, the verification unit 270 verifies the integrity of the encryption key using the unbound additional information.

If the bound data is unbound by the unbinding unit 250, the decryption unit 260 decrypts the encrypted data using the unbound encryption key. If the unbound additional information has changed, the encryption key has also changed together with the additional information. Accordingly, the decryption unit 260 cannot decrypt the encrypted data using that unbound encryption key.

The data processing unit 280 stores the data decrypted by the decryption unit 260 in the storage unit 220, and plays the relevant data at the request of the user.

If it is determined by the verification unit 270 that the additional information and the encryption key have changed, the security risk situation determination unit 290 is aware of a security risk situation, and requests the server 100 to manage the risk by transmitting information about the security risk situation to the server 100.

The detailed operating flows of the server and the user terminal of the present invention having the above construction will be described in detail below with reference to FIGS. 4 to 6.

Figure 4:
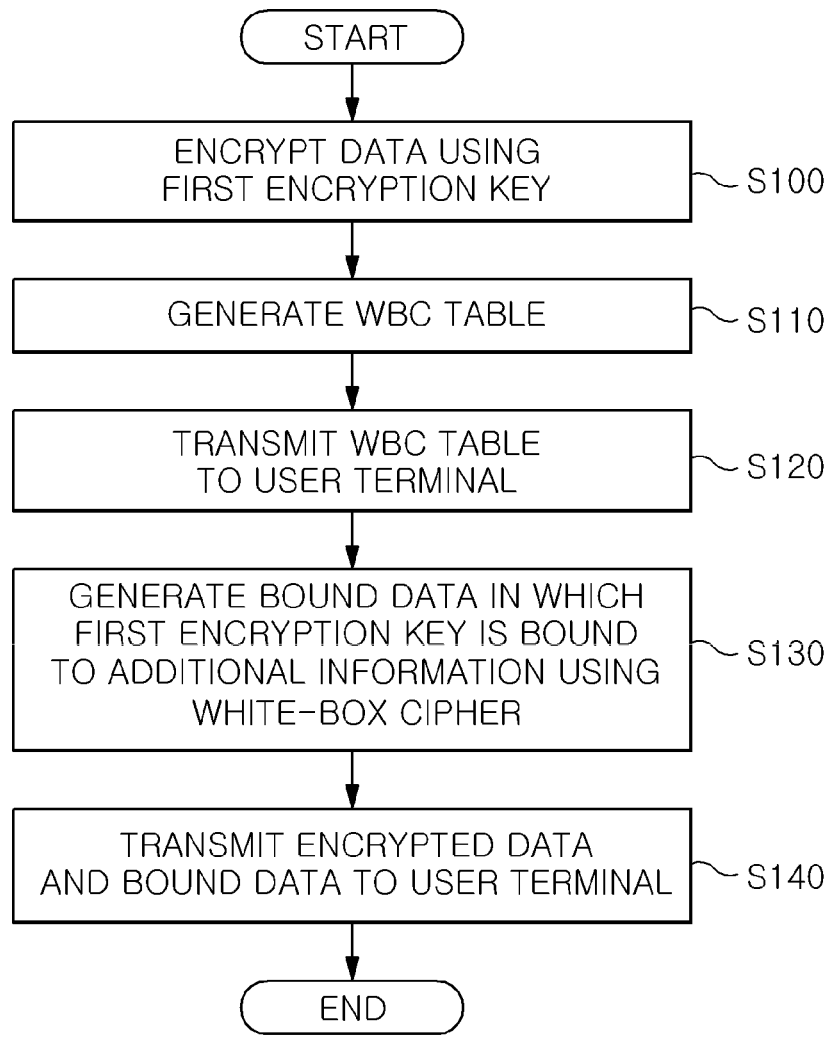
FIG. 4 is a flowchart showing the operating flow of an encrypted data transmission method performed by the server according to the present invention.

FIG. 4 is a flowchart showing the operating flow of an encrypted data transmission method performed by the server.

As shown in FIG. 4, the server 100 generates encrypted data by encrypting data using a first encryption key at step S100.

Further, the server 100 generates a WBC table required to bind the first encryption key with additional information related to the encrypted data at step S110, and transmits the WBC table to the user terminal 200 at step S120.

In FIG. 4, after step S100, steps S110 and S120 are shown as being performed, but steps S110 and S120 may be primarily performed prior to step S100 according to the implementation of an embodiment.

Meanwhile, when data encryption is completed, the server 100 generates bound data in which the first encryption key used to encrypt the relevant data is bound to the additional information related to the encrypted data, using a white-box cipher included in the WBC table at step S130.

Thereafter, the server 100 transmits both the encrypted data obtained at step S100 and the bound data obtained at step S130 to the user terminal 200 at the request of the user terminal 200 at step S140.

Figure 5:
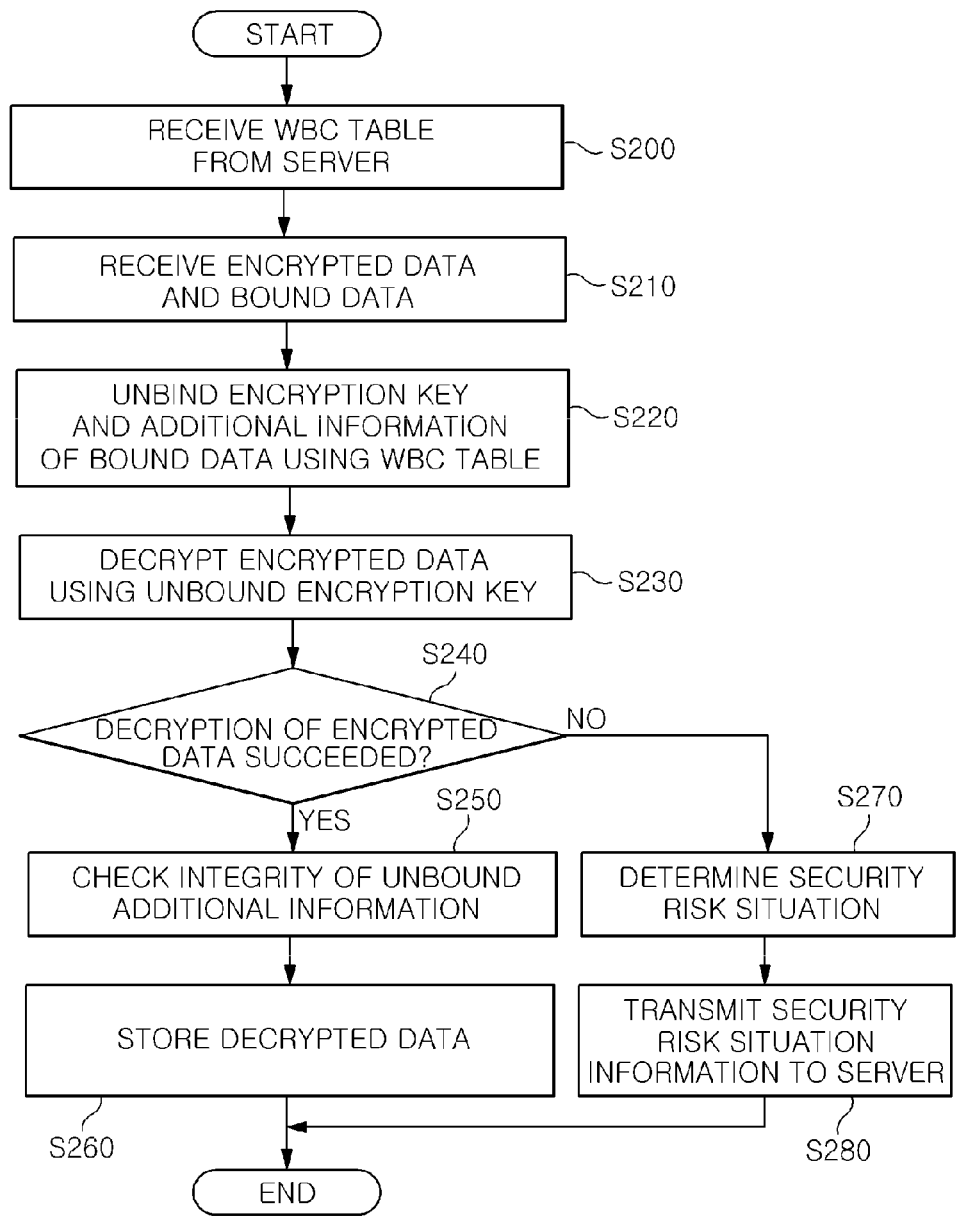
FIG. 5 is a flowchart showing the operating flow of an encrypted data decryption method performed by the user terminal according to the present invention.

FIG. 5 is a flowchart showing the operating flow of an encrypted data decryption method performed by the user terminal according to the present invention.

Referring to FIG. 5, when requesting data from the server 100, the user terminal 200 receives from the server 100 a WBC table required to unbind the encryption key of the relevant data at step S200.

Thereafter, the user terminal 200 receives both encrypted data and bound data from the server 100 at step S210. In this case, the user terminal 200 unbinds the encryption key and additional information of the bound data, received at step S210, using the WBC table, received at step S200, at step S220.

In other words, the user terminal 200 unbinds the first encryption key and the additional information bound at step S130 of FIG. 4 using the WBC table. Of course, when the bound data received at step S210 is bound data which has been rebound due to the occurrence of a security risk situation, the binding of an nth encryption key and additional information is released from the bound data.

Meanwhile, the server 100 decrypts the encrypted data using the encryption key unbound at step S220 at step S230. In this case, since the encryption key and the additional information of the bound data were bound using the white-box cipher, the encryption key automatically changes when the additional information changes, and thus it is impossible to decrypt the encrypted data using only that changed encryption key.

If the decryption of the encrypted data succeeds using the unbound encryption key at step S240, the user terminal 200 checks the integrity of the additional information and the encryption key which have been unbound at step S250, and stores the decrypted data at step S260.

Meanwhile, if the decryption of the encrypted data fails using the unbound encryption key at step S240, the user terminal 200 determines that a security risk situation has occurred at step S270, and requests the server 100 to manage the risk by transmitting information about the security risk situation to the server 100 at step S280. Of course, the user terminal 200 may eliminate therefrom the relevant data subjected to the security risk.

Figure 6:
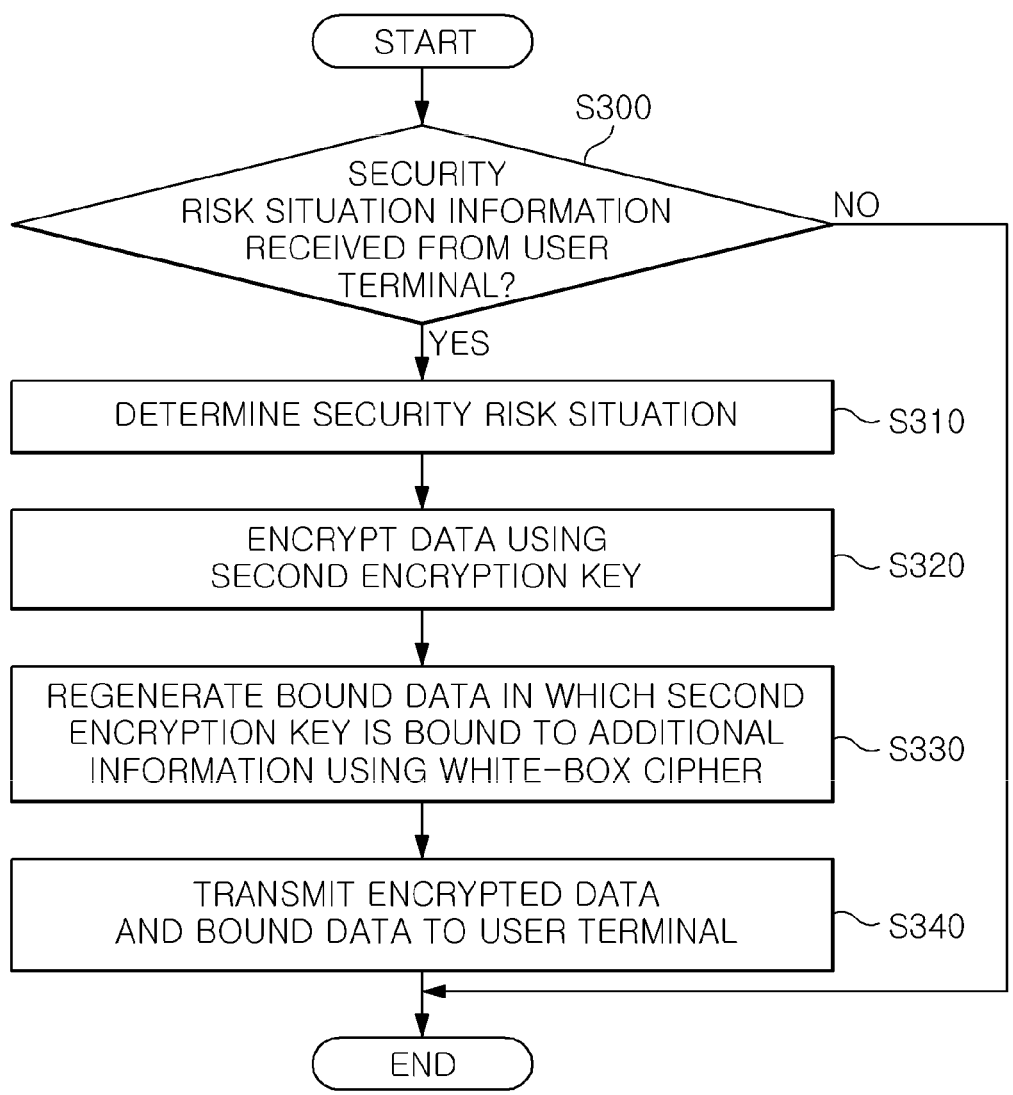
FIG. 6 is a flowchart showing the operating flow of a risk management method performed by the server according to the present invention.

FIG. 6 is a flowchart showing the operating flow of a risk management method performed by the server according to the present invention.

As shown in FIG. 6, when information about a security risk situation is received from the user terminal 200 at step S300, the server 100 determines the security risk situation of the user terminal 200 to occur at step S310.

In this case, in order to re-provide the user terminal 200 with relevant data which was subjected to a security risk, the server 100 encrypts the relevant data using a second encryption key which has been newly created at step S320. Of course, the server 100 may update the version of the relevant data before encrypting the relevant data using the second encryption key.

Thereafter, the server 100 regenerates bound data in which the second encryption key is bound to additional information related to the relevant data by using the white-box cipher at step S330, and transmits both the encrypted data obtained at step S320 and the bound data generated at step S330 to the user terminal 200 at step S340.

If security risk situation information is received again from the user terminal 200, the server 100 generates an nth encryption key, and then repeats steps S310 to S340, thus enabling the risk of the user terminal 200 to be processed.

As described above, the present invention is advantageous in that an encryption key is bound to additional information such as data authority information, so that when the additional information changes, the encryption key also changes together with the additional information, thus making it impossible to decrypt data, and so that the encryption key is concealed using white-box cryptography, thus making it impossible to decipher the encryption key.

Further, the present invention is advantageous in that when a user terminal is aware of a security risk situation involving encrypted data, an encryption key or the like, the user terminal reports this to a server, so that the encryption key and the encrypted data are redistributed, thus preventing data from being illegally duplicated and used on other platforms.

As described above, although the content protection apparatus and method using the binding of additional information to an encryption key according to the present invention have been described with reference to the attached drawings, the present invention is not limited by the embodiments and drawings disclosed in the present specification, and various modifications and changes are possible without departing from the scope of the present invention.

What is claimed is:

1. A content protection apparatus using binding of additional information to an encryption key, comprising:
   an encryption unit configured to create an encryption key required to encrypt data requested by a user terminal and encrypt the data to generate encrypted data;
   an additional information management unit configured to manage additional information including authority information about the data;
   a White-Box Cryptography (WBC) processing unit configured to generate a WBC table, wherein the WBC table is used to bind the encryption key corresponding to the encrypted data to the additional information;
   a bound data generation unit configured to generate bound data in which the encryption key is bound to the additional information, using a cipher included in the WBC table; and
   a risk management unit configured to, if a request for management of a risk is received from the user terminal, determine and process a security risk situation involving the encrypted data and the bound data which have been transmitted to the user terminal.

2. The content protection apparatus of claim 1, wherein the bound data is set such that when the additional information changes, the encryption key bound to the additional information also automatically changes.

3. The content protection apparatus of claim 1, wherein the WBC processing unit transmits the WBC table to the user terminal before transmitting both the encrypted data and the bound data to the user terminal.

4. The content protection apparatus of claim 1, wherein the encryption unit is configured to create a new encryption key required to encrypt the data at a request of the risk management unit if it is determined that the security risk situation has occurred and generate re-encrypted data using the new encryption key.

5. The content protection apparatus of claim 4, wherein the bound data generation unit regenerates bound data by binding the new encryption key to the additional information at a request of the risk management unit if the new encryption key is created.

6. The content protection apparatus of claim 1, wherein the data management unit upgrades a software version of the data at a request of the risk management unit if it is determined that the security risk situation has occurred.

7. A content protection apparatus using binding of additional information to an encryption key, comprising:
- a White-Box Cryptography (WBC) table mapping unit configured to, when encrypted data and bound data are received from a server, extract a white-box cipher required to unbind the bound data from a pre-stored WBC table;
- an unbinding unit configured to unbind an encryption key and additional information of the bound data using the white-box cipher;
- a decryption unit configured to decrypt the encrypted data using the unbound encryption key if the bound data has been unbound; and
- a data processing unit configured to provide the decrypted data to a user at a request of the user.

8. The content protection apparatus of claim 7, further comprising a security risk situation determination unit configured to, if decryption of the encrypted data has failed, determine that as the additional information has changed due to an attack, the encryption key has also changed, and then request that the server manage a risk.

9. A content protection method using binding of additional information to an encryption key, the method being performed by a server, comprising:
- creating an encryption key required to encrypt data requested by a user terminal and then generating encrypted data in which the data is encrypted;
- generating a White-Box Cryptography (WBC) table to bind the encryption key, which corresponds to the encrypted data, to additional information, which includes authority information about the data;
- generating bound data by binding the encrypted key to the additional information using a cipher included in the WBC table;
- transmitting the encrypted data and the bound data to the user terminal; and
- if a request for management of a risk involving the encrypted data or the bound data is received from the user terminal, determining and processing a security risk situation involving the encrypted data or the bound data.

10. The content protection method of claim 9, wherein the bound data is set such that when the additional information changes, the encryption key bound to the additional information also automatically changes.

11. The content protection method of claim 9, further comprising, before transmitting the encrypted data and the bound data to the user terminal, transmitting the WBC table to the user terminal.

12. The content protection method of claim 9, further comprising, if it is determined that the security risk situation has occurred, creating a new encryption key required to encrypt the data, and then generating encrypted data by re-encrypting the data using the new encryption key.

13. The content protection method of claim 12, further comprising, if the new encryption key has been created, regenerating bound data by binding the new encryption key to the additional information.

14. The content protection method of claim 9, further comprising, if it is determined that the security risk situation has occurred, upgrading a software version of the data.

15. A content protection method using binding of additional information to an encryption key, the method being performed by a user terminal, comprising:
- when encrypted data and bound data are received from a server, unbinding an encryption key and additional information of the bound data using a white-box cipher included in a pre-stored White-Box Cryptography (WBC) table;
- when the bound data is unbound, decrypting the encrypted data using the unbound encryption key; and
- playing the decrypted data at a request of a user.

16. The content protection method of claim 15, further comprising, if decryption of the encrypted data has failed, determining that as the additional information has changed due to an attack, the encryption key has changed, and then requesting that the server manage a risk.

\* \* \* \* \*